(12) United States Patent
Ishihara et al.

(10) Patent No.: US 8,232,347 B2
(45) Date of Patent: Jul. 31, 2012

(54) METHOD OF MAKING OXYGEN-ABSORBING RESIN COMPOSITION

(75) Inventors: Takayuki Ishihara, Kanagawa (JP); Hiroaki Goto, Kanagawa (JP); Yoshihiro Ohta, Kanagawa (JP); Yuji Yamaguchi, Kanagawa (JP); Go Saito, Kanagawa (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 412 days.

(21) Appl. No.: 12/700,829

(22) Filed: Feb. 5, 2010

(65) Prior Publication Data

US 2010/0133468 A1   Jun. 3, 2010

Related U.S. Application Data

(63) Continuation of application No. 12/016,228, filed on Jan. 18, 2008, now abandoned, which is a continuation of application No. PCT/JP2006/314231, filed on Jul. 19, 2006.

(30) Foreign Application Priority Data

Jul. 19, 2005   (JP) .................. 2005-209112

(51) Int. Cl.
*C08G 81/00* (2006.01)
*B29B 7/00* (2006.01)
*B29B 9/00* (2006.01)
*B29B 9/10* (2006.01)

(52) U.S. Cl. ............ 525/11; 525/13; 525/51; 525/902

(58) Field of Classification Search ............ 525/11, 525/13, 51, 902; 428/402–407
See application file for complete search history.

(56) References Cited

U.S. PATENT DOCUMENTS

| | | | | |
|---|---|---|---|---|
| 4,536,454 A * | 8/1985 | Haasl | | 428/516 |
| 5,211,875 A | 5/1993 | Speer et al. | | |
| 5,310,497 A | 5/1994 | Ve Speer et al. | | |
| 5,346,644 A | 9/1994 | Speer et al. | | |
| 5,399,289 A | 3/1995 | Speer et al. | | |
| 5,776,361 A * | 7/1998 | Katsumoto et al. | | 252/188.28 |
| 6,233,907 B1 | 5/2001 | Cook, Jr. et al. | | |
| 6,287,481 B1 | 9/2001 | Luthra et al. | | |
| 6,514,357 B1 * | 2/2003 | Tada et al. | | 148/251 |
| 6,599,598 B1 * | 7/2003 | Tai et al. | | 428/36.6 |
| 6,610,772 B1 | 8/2003 | Clauberg et al. | | |
| 6,960,376 B2 | 11/2005 | Tai et al. | | |
| 7,427,436 B2 | 9/2008 | Ishihara et al. | | |
| 7,709,567 B2 * | 5/2010 | Goto et al. | | 524/398 |
| 2003/0157283 A1 | 8/2003 | Tai et al. | | |
| 2005/0142373 A1 | 6/2005 | Komatsu et al. | | |
| 2006/0211811 A1 | 9/2006 | Goto et al. | | |
| 2007/0248834 A1 * | 10/2007 | Ishihara et al. | | 428/500 |
| 2008/0152915 A1 * | 6/2008 | Ishihara et al. | | 428/407 |
| 2008/0286584 A1 * | 11/2008 | Ishihara et al. | | 428/451 |

FOREIGN PATENT DOCUMENTS

| | | |
|---|---|---|
| EP | 0 546 546 A1 | 6/1993 |
| EP | 1 553 137 A1 | 7/2005 |
| EP | 1 672 019 A1 | 6/2006 |
| EP | 1 816 157 A1 | 8/2007 |
| JP | 05-115776 | 5/1993 |
| JP | 05-156095 | 6/1993 |
| JP | 05-194949 | 8/1993 |
| JP | 8-502202 | 3/1996 |
| JP | 8-502306 | 3/1996 |
| JP | 2000-515466 | 11/1998 |
| JP | 2000-080172 | 3/2000 |
| JP | 2001-039475 | 2/2001 |
| JP | 2001-106866 | 4/2001 |
| JP | 2004-262552 | 9/2004 |
| JP | 2005-015055 A | 1/2005 |
| JP | 2005-042089 A | 2/2005 |
| JP | 2006-037068 A | 2/2006 |
| WO | 2004/018556 A1 | 3/2004 |
| WO | 2005/005533 A1 | 1/2005 |
| WO | 2006/057201 A1 | 6/2006 |

OTHER PUBLICATIONS

English translation of the Written Opinion of the International Searching Authority for PCT/JP2006/314321.
Extended European Search Report for EP 06781238.8, dated Mar. 16, 2010.

* cited by examiner

*Primary Examiner* — Hoa (Holly) Le
(74) *Attorney, Agent, or Firm* — Hoffmann & Baron, LLP

(57) ABSTRACT

A high-quality oxygen-absorbing resin composition which is obtained without suffering resin scorching. Also provided are pellets for the oxygen-absorbing resin composition which comprise a thermoplastic resin (A) and an oxidation catalyst. After the pellets are mixed with a trigger resin and a thermoplastic resin (C), the trigger resin functions as a trigger to cause the oxidation of the thermoplastic resins (A) and (C) to proceed. As a result, the resultant composition absorbs oxygen.

5 Claims, No Drawings

METHOD OF MAKING OXYGEN-ABSORBING RESIN COMPOSITION

CROSS-REFERENCE TO RELATED APPLICATIONS

This application is a continuation of U.S. patent application Ser. No. 12/016,228, filed Jan. 18, 2008, which is a continuation of International Application No. PCT/JP2006/314231, filed Jul. 19, 2006, which claims the benefit of Japanese Application No. 2005-209112, filed Jul. 19, 2005, the contents of which are incorporated by reference herein.

FIELD OF THE INVENTION

The present invention relates to oxygen-absorbing resin compositions used as a packaging material for contents susceptible to deterioration in the presence of oxygen, in particular, beverages, foods, pharmaceutical agents or the like.

BACKGROUND OF THE INVENTION

Presently, various plastic containers are used for packaging because of their advantages such as light weight, transparency and easiness of molding.

However, because an oxygen barrier property of the plastic containers is lower than those of metal containers and glass containers, the plastic containers have problems in that the contents of the containers degenerate and that the flavor of the contents becomes worse.

For preventing these problems the plastic container walls have a multi-layer structure in which at least one layer is made of a resin having an excellent oxygen barrier property such as an ethylene-vinyl alcohol copolymer. In addition, there are other kinds of containers having an oxygen-absorbing layer for absorbing oxygen remaining in the containers and also oxygen gas penetrating into the containers from the outside. Oxygen gas absorbers (deoxidizer) used for forming the oxygen-absorbing layer include, for example, those mainly containing a reducing substance such as iron powder (see, for instance, Patent Document 1 specified below); or those containing an oxygen scavenger consisting of an ethylenically unsaturated hydrocarbon and a transition metal catalyst (see, for instance, Patent Document Nos. 2 to 4 specified below).

A method in which an oxygen absorber such as iron powder is incorporated into a resin and the resulting resin composition is used as a packaging material for forming the wall of a container used for packaging shows a sufficiently high ability to absorb oxygen gas, but the resulting resin composition has a color hue peculiar to the iron powder. Therefore, said method is limited in its application and cannot be used in the field of packaging in which transparency is required. Moreover, in a method in which an oxygen scavenger consisting of an ethylenically unsaturated hydrocarbon and a transition metal catalyst is used, the ethylenically unsaturated hydrocarbon per se absorbs oxygen gas to ensure the oxygen-barrier properties of the scavenger and thus the amount of the ethylenically unsaturated hydrocarbon to be incorporated into the scavenger should be increased to some extent. However, a problem arises such that the resulting resin composition is insufficient in moldability and transparency if the ethylenically unsaturated hydrocarbon is incorporated into the composition in an increased amount. For this reason, the resin composition is limited in regard to the term during which it can efficiently absorb oxygen gas and thus the composition never satisfies the desired requirements for the long-term storage of the foregoing contents. In addition, coloring of the composition occurs and a bad smell is given off from the composition through the absorption of oxygen.

For solving these problems, the inventors of this invention have found that a resin composition which comprises a thermoplastic resin, a resin capable of serving as a trigger for the oxidation of said thermoplastic resin, and a transition metal catalyst in specific amounts can absorb oxygen gas because said trigger resin acts on the thermoplastic resin for the initiation of the oxidation thereof (see Patent Documents 5 and 6 specified below).

Patent Document 1: Japanese Examined Patent Publication Sho 62-1824.
Patent Document 2: Japanese Un-Examined Patent Publication 2001-39475.
Patent Document 3: Japanese Un-Examined Patent Publication Hei 5-115776.
Patent Document 4: TOKUHYO Hei 8-502306.
Patent Document 5: International Publication 2004/18556 Pamphlet.
Patent Document 2: Japanese Un-Examined Patent Publication 2005-42089.

SUMMARY OF THE INVENTION

However, it is found that preparing a resin composition comprising a thermoplastic resin, a resin capable of serving as a trigger for the oxidation of said thermoplastic resin and a transition metal catalyst by melt kneading causes the resin composition to burn and thus is undesirable from a quality point of view.

Accordingly, it is an object of the present invention to provide a high-quality oxygen-absorbing resin composition without the resin composition burning.

DETAILED DESCRIPTION OF THE PREFERRED EMBODIMENTS

The inventors of this invention have conducted various studies to solve the foregoing problems, and as a result have found that after a masterbatch containing a thermoplastic resin and a transition metal catalyst is obtained, adding an additional thermoplastic resin and a trigger resin into the masterbatch and then melt kneading the resulting mixture provide a high-quality oxygen-absorbing resin composition without the resin composition burning and have thus completed the present invention. More specifically, the present invention provides a pellet for the oxygen-absorbing resin composition which comprise a thermoplastic resin (A) and an oxidation catalyst wherein when the pellet is mixed with a trigger resin and a thermoplastic resin (C), the trigger resin functions as a trigger to cause the oxidation of the thermoplastic resins (A) and (C) to proceed, whereby oxygen is absorbed.

In addition, the present invention provides a multilayer pellet for the oxygen-absorbing resin composition which comprises a core part containing a thermoplastic resin (A) and an oxidation catalyst and a coating part containing a thermoplastic resin (B) wherein when the pellet is mixed with a trigger resin and a thermoplastic resin (C), the trigger resin functions as a trigger to cause the oxidation of the thermoplastic resins (A), (B) and (C) to proceed, whereby oxygen is absorbed.

In addition, the present invention provides an oxygen-absorbing resin composition obtainable by mixing said pellet, a thermoplastic resin (C) and a trigger resin which functions as a trigger of oxidation In addition, the present invention provides an oxygen-absorbing resin composition obtainable by mixing a masterbatch containing a thermoplastic resin (A) and an oxidation catalyst, a thermoplastic resin (C) and the trigger resin which functions as a trigger of the oxidation, wherein the trigger resin functions as a trigger to cause the oxidation of the thermoplastic resin (C) to proceed, whereby oxygen is absorbed.

A pellet according to the present invention comprises a thermoplastic resin (A) and a transition metal catalyst. In another embodiment, a multilayer pellet according to the present invention comprises a core part containing a thermoplastic resin (A) and an oxidation catalyst and a coating part containing a thermoplastic resin (B).

The thermoplastic resin (A) preferably is a thermoplastic resin having ethylene structures in the molecular structure, for instance, polyethylenes such as low density polyethylene, medium density polyethylene, high density polyethylene, linear low density polyethylene, linear ultra low density polyethylene; polypropylenes such as isotactic or syndiotactic polypropylene; ethylene moiety-containing copolymers such as ethylene-propylene copolymer, polybutene-1, ethylene-butene-1 copolymer, ethylene-propylene-butene-1 copolymer, ethylene-vinyl acetate copolymer, ethylene-vinyl alcohol copolymer; propylene moiety-containing copolymers such as propylene-butene-1 copolymer; ionically crosslinked olefin copolymer; or a blend thereof. The thermoplastic resins preferably used herein are polyethylene, polypropylene, ethylene-propylene copolymer, ethylene moiety-containing copolymers and propylene moiety-containing copolymers.

Also, usable herein as the thermoplastic resin having ethylenic structures in its molecular structure is an acid-modified olefinic resin obtained by modifying, through grafting, the foregoing resin as a base polymer with an unsaturated carboxylic acid or a derivative thereof.

In addition, the foregoing thermoplastic resin is preferably a resin prepared by the polymerization of a $C_2$ to $C_{20}$ monomer and substantially free of any ethylenically unsaturated bond. Moreover, the thermoplastic resin is preferably a linear low density polyethylene whose side chain consists of a linear hydrocarbon in the amount of not more than 0.003 eq/g, or a resin having an aliphatic side chain in the total amount of not more than 0.005 eq/g and in which resin the aliphatic side chain consists of a cyclic hydrocarbon, a part of the ring structure of which is shared with that of the main chain, or in which resin the aliphatic side chain consists of the foregoing cyclic hydrocarbon and a linear hydrocarbon. In this respect, the term "side chain" herein used means a molecular chain branched off from the main chain. In a case of a linear hydrocarbon, the number of side chains is 1, if the main chain branches off only at one point. In a case of the cyclic hydrocarbon such as that represented by the chemical formula 1 given later, the number of branches with respect to the main chain is 2, but the number of side chains is defined to be 1 based on the assumption that the whole cyclic compound is a side chain. In the foregoing linear low density polyethylene having such a side chain consisting of a linear hydrocarbon in the amount of not more than 0.003 eq/g, the amount (eq/g) of the linear hydrocarbon in the polyethylene means a value obtained by determining the number of side chains present in 1 g of the resin and then dividing the resulting number of side chains by Avogadro's constant and if representing Avogadro's number and the number of side chains present in 1 g of the resin N and n, respectively, this value can be calculated according to the relation: n/N (eq/g in the following description is also calculated in the same way).

Regarding the linear low density polyethylene used in the aforementioned pellet of the present invention, a comonomer capable of forming linear side chains is selected and the comonomer thus selected is then copolymerized with ethylene to thus form a desired low density polyethylene whose a side chain consists of linear hydrocarbons in the amount of not more than 0.003 eq/g. The resin whose side chain consists of a linear hydrocarbon would be completely free of any molecular cleavage frequently observed at the branched site of a resin unlike the resins having side chains carrying branches and this would in turn inhibit the generation of any low molecular weight volatile component. Moreover, tertiary carbon-carrying sites quite susceptible to oxidation are intentionally introduced into the molecular chain of a resin to control the progress of the oxidation and to thus prevent the occurrence of any random molecular breakage accompanied by the oxidation of secondary carbon-carrying sites or the like.

Regarding the foregoing polymerization, the foregoing polymer may properly be selected from those prepared using the conventional Ziegler-Natta catalyst or those prepared using a single site catalyst so long as they possess the desired molecular structures, but the foregoing polymerization which is carried out through the use of a single-site catalyst would be able to prevent the compositional ratio for copolymerization from varying throughout the entire molecular weight components. As a result, the resulting copolymer has a uniform molecular structure and accordingly, the molecular chains constituting the copolymer are uniformly oxidized, any excess progress of a side reaction is inhibited and the formation of any by-product through the oxidation due to undesirable molecular breakage can thus certainly be inhibited. Such a catalyst preferably used herein may be, for instance, metallocene type ones. Examples of other catalysts usable herein are those used for the polymerization of olefins, which are recognized to be post-metallocene catalysts and, in particular, preferred examples of the latter are phenoxy imine catalysts (FI Catalyst). On the other hand, when the foregoing monomers are polymerized using a catalyst other than the single site catalyst, for instance, a multi-site catalyst such as a Ziegler-Natta catalyst, it is quite difficult for every molecular chains to make the copolymerization ratio of ethylene to comonomers uniform and accordingly, there are observed undesirable conditions such that the oxidation locally takes place at particular sites. In addition, if the content of the side chains branched off from the main chain exceeds 0.003 eq/g, the main chain of the resin has an increased rate of tertiary carbon atoms which correspond to the side chain-bonding points and which are preferentially susceptible to oxidation, this results in an increase of the frequency of the formation of small molecules due to the breakage of the main chain and as a result, this further become a cause of the formation of low molecular weight components in a large amount. This, in turn, adversely affects the flavor and taste of the contents to be packaged in the resulting resin. The content of the side chains preferably ranges from 0.0003 to 0.003 eq/g, in particular, 0.0005 to 0.003 eq/g. The use of such a resin is preferred since if the content thereof falls within the range specified above, not only the amount of by-products formed through the oxidation of the resulting resin can be reduced, but also the resulting resin surely has stable oxygen-absorbability and good stability to heat.

The aforementioned linear low density polyethylene may preferably be, for instance, copolymers of ethylene and α-olefin prepared using a metallocene catalyst such as copolymers of ethylene and 1-butene, copolymers of ethylene and 1-hexene and copolymers of ethylene and 1-octene. These resins may be used alone or in any combination of at least two of them.

The preparation of the foregoing resin through the polymerization using a single-site catalyst may be carried out using any industrially acceptable method, but it is preferably carried out according to the liquid phase technique since this technique has most widely been employed in this field.

On the other hand, the pellet of the present invention may comprise a resin comprising an aliphatic side chain in the total amount of not more than 0.005 eq/g and in which resin the aliphatic side chain consists of a cyclic hydrocarbon, a part of the ring structure of which is shared with that of the main chain, or a resin in which an aliphatic side chain consists of the foregoing cyclic hydrocarbon and a linear hydrocarbon and this resin can be prepared by the copolymerization of ethylene and an alicyclic hydrocarbon carrying an ethylenically unsaturated bond, or the copolymerization of ethylene, an alicyclic hydrocarbon carrying an ethylenically unsaturated bond, and a comonomer capable of forming a linear side chain. This resin comprises, in the main chain, cyclic hydrocarbons in which a part of the ring structure thereof is in common with the main chain. Accordingly, any decomposition at the cyclic portion thereof never takes place unless two portions of a tertiary carbon present in the main chain are simultaneously cleaved and the resin is thus less susceptible to the formation of by-products through oxidation in comparison with the quantity of absorbed oxygen observed for the resin.

Moreover, if a side chain represented by the following chemical formula 1 is formed, any low molecular weight component is not generated even when a tertiary carbon atom present in the side chain is oxidized, as shown in the following Scheme I:

Chemical Formula 1:

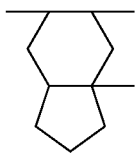

Scheme 1:

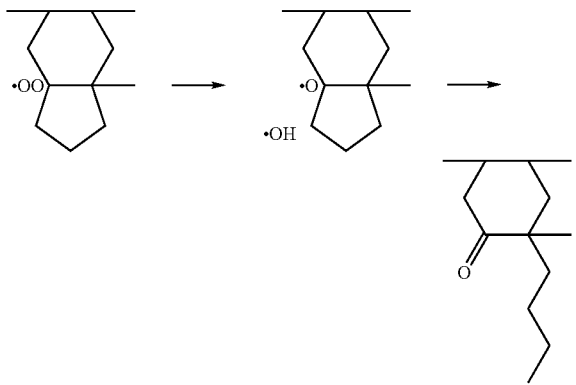

These resins each carrying aliphatic cyclic side chains have such a tendency that they have higher glass transition temperatures. However, if a resin has a high glass transition point, the molecular chains present in the resin have insufficient mobility at ordinary temperature and the resin is thus liable to have a reduced oxygen-absorbing rate. In this respect, the glass transition point of a resin can appropriately be reduced by the incorporation of side chains derived from linear hydrocarbons through the copolymerization with a proper amount of ethylene or the copolymerization with a linear comonomer other than ethylene. In this case, the side chains derived from linear hydrocarbons are preferably those having not less than 4 carbon atoms. Preferred glass transition point of the resin is not higher than 50° C.

In the resin component (B), which comprise an aliphatic side chain in the total amount of not more than 0.005 eq/g and in which resin the aliphatic side chain consists of a cyclic hydrocarbon, a part of the ring structure of which is shared with that of the main chain, or in which resin the aliphatic side chain consists of the foregoing cyclic hydrocarbon and a linear hydrocarbon, the resin may be one prepared by block copolymerization, random copolymerization or alternating copolymerization of monomers each carrying a cyclic side chain, but the aliphatic cyclic side chain portions of the resin are liable to have reduced mobility and accordingly, the resin is preferably prepared by the random copolymerization or the alternating copolymerization of the foregoing monomers.

If the content of the total aliphatic side chains linked to the main chain exceeds 0.005 eq/g, the resulting resin has an extremely high density of the tertiary carbon atoms present in the main chain thereof and this in turn leads to an increase in the frequency of the formation of low molecular weight molecules due to the cleavage of the main chain. Consequently, this becomes a cause of the formation of a large amount of low molecular weight components and, in turn, adversely affects the flavor of the contents to be packaged in the resulting resin.

The content of the aliphatic side chains preferably ranges from 0.0005 to 0.005 eq/g, in particular, 0.001 to 0.005 eq/g. The use of such a resin is preferred since if the content thereof falls within the range specified above, not only the amount of by-products formed through the oxidation of the resulting resin can be reduced, but also the resulting resin surely has stable oxygen-absorbability and good stability to heat.

The resin consisting of moieties derived from a cyclic hydrocarbon in which a part of the ring structure is in common with the main chain thereof or the resin in which an aliphatic side chain consists of the foregoing cyclic hydrocarbon and a linear hydrocarbon is preferably prepared by the polymerization carried out using a single-site catalyst since this polymerization technique would permit the preparation of a variety of copolymers and the control of the microstructures of the resulting copolymers. Such a single-site catalyst preferably used herein may be, for instance, the aforementioned metallocene type ones and those used for the polymerization of olefins, which are recognized to be post-metallocene catalysts. Specific examples thereof include, but not limited to, catalysts each comprising Ti or Zr as a central metal and two indenyl groups, or the combination of a cyclopentadienyl group and a benzo-indenyl group, as the ligands thereof. Preferably used herein further include, for instance, phenoxy titanium type catalysts comprising combinations of cyclopentadienyl type ligands with phenoxy type ligands. Specific examples of the resins carrying cyclic side chains prepared using such single-site catalysts are cyclic olefin copolymers (APEL: available from Mitsui Chemicals, Inc.).

The resin which a part of the ring structure of the cyclic hydrocarbon is shared with the main chain, or whose side chain consists of said cyclic hydrocarbon and said linear hydrocarbon can be prepared by the copolymerization of, for instance, ethylene and cyclobutene; ethylene and cyclopentene; ethylene and cyclohexene; or ethylene and cyclooctene using, for instance, a metallocene type single-site catalyst comprising Zr as a central metal. Moreover, linear aliphatic side chains may be incorporated into the resulting resin by the use of a comonomer such as 1-butene, 1-hexene and/or 1-octene in addition to the foregoing 2-component system. Further, the structure of the resulting copolymer such as block and random copolymer structures can be obtained by appropriately selecting the kind of catalyst used, as has been discussed above.

The resins whose number of side chains falls within the range specified above according to the present invention can be prepared by controlling the compositional ratio of the foregoing copolymers.

A part of the hydrogen atoms constituting the cyclic hydrocarbon may be substituted with other atoms or atomic groups. Examples of such atomic groups are alkyl groups, those derived from aldehydes, carboxyl groups and hydroxyl group. In case of, for instance, cyclohexene, easily available as reagents are monomers such as 3-cyclohexene-1-carboxyaldehyde, 3-cyclohexene-1-carboxylic acid and 3-cyclohexene-1-methanol. The frequency of such substitution of a hydrogen atom with an atomic group is preferably not more than 1, per side chain consisting of a cyclic hydrocarbon.

If the substituent atomic group is a polar one, the kind of the central metal and/or the ligand of a catalyst to be used may appropriately be selected depending on, for instance, the bulkiness of the hydrocarbon molecule substituted with the atomic group and the degree of the polarity of the molecule. As the catalyst used for the copolymerization of ethylene and methyl methacrylate as a polar monomer, there have been known metallocene type ones each comprising Sm as the central metal and two cyclopentadienyl groups as the ligands.

The resin may likewise comprise, therein, an aromatic side chain other than the aliphatic one such as a phenyl group. In this case, however, the moieties carrying such aromatic groups are preferably present in the resin, in the form of, for instance, styrene blocks.

Furthermore, it is also possible to use a blend of the foregoing linear low density polyethylene whose a side chain consists of linear hydrocarbons in the amount of not more than 0.003 eq/g and a resin comprising an aliphatic side chain in the total amount of not more than 0.005 eq/g and in which resin the aliphatic side chain consists of a cyclic hydrocarbon, a part of the ring structure of which is shared with that of the main chain, or in which resin the aliphatic side chain consists of the foregoing cyclic hydrocarbon and a linear hydrocarbon.

At least two of the foregoing thermoplastic resins may preferably be used in combination in view of the reduction of the amount of by-products, the improvement of the moldability and the improvement of the oxygen-absorbing characteristics. In particular, preferably used herein are resin blends in which at least one polyethylene is a linear low density polyethylene prepared by copolymerizing ethylene and not less than 4% by mass of 1-alkene having 3 to 6 carbon atoms. When using at least two such linear low density polyethylene resins each prepared by copolymerizing ethylene and not less than 4% by mass of 1-alkene having 3 to 6 carbon atoms, the blend preferably comprises, in combination, at least two kinds of polyethylenes having molecular weights different from one another. The difference in the molecular weight between these two kinds of polyethylenes is preferably not less than $5.0 \times 10^2$, more preferably $5.0 \times 10^2$ to $3.0 \times 10^4$ and further preferably $5.0 \times 10^2$ to $2.0 \times 10^4$, as expressed in terms of the number average molecular weight. Examples of the foregoing 1-alkenes include 1-propylene, 1-butene, 1-pentene, 1-hexene and mixture thereof. From among them, preferably used herein are 1-butene, 1-pentene and 1-hexene. The amount of the 1-alkene having 3 to 6 carbon atoms to be copolymerized is preferably in the range of from 4 to 30% by mass and more preferably 4 to 20% by mass. The thermoplastic resin used herein may likewise be high pressure processed low density polyethylenes. When using linear low density polyethylenes having molecular weights different from one another, the mixing ratio of a high molecular weight polyethylene and a low molecular weight polyethylene is preferably in the range of from 5:5 to 9:1, more preferably 6:4 to 8:2 and further preferably 6:4 to 7:3. Alternatively, when using a linear low density polyethylene and a high pressure processed low density polyethylene in combination, the mixing ratio of the former to the latter is preferably in the range of from 5:5 to 9:1, more preferably 6:4 to 9:1 and further preferably 6:4 to 8:2. Further, the content of carbon-carbon double bonds in the foregoing linear low density polyethylene or the high pressure processed low density polyethylene is not subject to quality control, but it is preferably not more than $0.4 \times 10^{-4}$ eq/g.

It is preferably a thermoplastic resin which can be easily extruded upon heating and melting thereof without it remaining in an extruder and which has good thermostability. A resin having good thermostability means a resin which has a small reduction rate by heat, this reduction rate by heat being preferably 0 to 10%, more preferably 0 to 5% at 250° C. when thermogravimetric analysis is conducted between 30 and 300° C. at rate of temperature increase of 10° C./min. The thermoplastic resin includes polyethylenes (PE) such as low-density polyethylene (LDPE), medium-density polyethylene (MDPE), high-density polyethylene (HDPE), linear low-density polyethylene (LLDPE), linear very low-density polyethylene (LVLDPE), polypropylenes (PP), ethylene-propylene copolymers, polybutene-1, ethylene-butene-1 copolymers, propylene-butene-1 copolymers, ethylene-propylene-butene-1 copolymers, ethylene-vinyl acetate copolymers, and ionic crosslinked olefinic copolymers (ionomers) or blends thereof.

The same as mentioned above regarding the thermoplastic resin (A) applies to the thermoplastic resin (B). The pellet of the present invention may be prepared by using the thermoplastic resin (B) identical to or different from the thermoplastic resin (A).

The oxidation catalyst preferably is a transition metal catalyst. Preferably used herein as transition metal catalysts are, for instance, metal components belonging to the Group VIII of Periodic Table such as iron, cobalt and nickel, but examples thereof also include metals of Group I such as copper and silver; metals of Group IV such as tin, titanium and zirconium; metals of Group V such as vanadium; metals of Group VI such as chromium; and metals of Group VII such as manganese. Among these metallic components, the cobalt component is particularly suitable for the intended purpose of the present invention because of its high oxygen-absorbing rate.

The foregoing transition metal catalyst is in general used in the form of a salt or a complex thereof with an inorganic or organic acid having a low valence.

Examples of inorganic acid salts thereof are halides such as chlorides; salts with sulfur atom-containing oxy-acids such as sulfates; salts with nitrogen atom-containing oxy-acids such as nitrates; salts with phosphorus atom-containing oxy-acids such as phosphates; and silicates.

On the other hand, examples of organic acids are carboxylic acids, sulfonic acids and phosphonic acids, but carboxylic acids are suitable for the intended purpose of the present invention among others and specific examples of the foregoing salts with carboxylic acids include those of the transition metals with carboxylic acids such as acetic acid, propionic acid, iso-propionic acid, butanoic acid, iso-butanoic acid, pentanoic acid, iso-pentanoic acid, hexanoic acid, heptanoic acid, iso-heptanoic acid, octanoic acid, 2-ethyl hexanoic acid, nonanoic acid, 3,5,5-trimethyl hexanoic acid, decanoic acid, neo-decanoic acid, undecanoic acid, lauric acid, myristic acid, palmitic acid, margaric acid, stearic acid, arachic acid, linderic acid, thujic acid, petroselinic acid, oleic acid, linoleic acid, linolenic acid, arachidonic acid, formic acid, oxalic acid, sulfamic acid and naphthenic acid. Preferred are transition metal salts of neo-decanoic acid, stearic acid and the like and specifically preferred is cobalt stearate.

On the other hand, the complexes of transition metals usable herein may be those with β-diketones or esters of β-keto-acids and examples of such β-diketones or esters of β-keto-acids usable herein are acetyl acetone, ethyl acetoacetate, 1,3-cyclohexadione, methylene-bis-1,3-cyclohexadione, 2-benzyl-1,3-cyclohexadione, acetyl tetralone, palmitoyl tetralone, stearoyl tetralone, benzoyl tetralone, 2-acetyl cyclohexanone, 2-benzoyl cyclohexanone, 2-acetyl-1,3-cyclo-hexanedione, benzoyl-p-chlorobenzoyl methane, bis(4-methylbenzoyl)methane, bis(2-hydroxybenzoyl)methane, benzoyl acetone, tri-benzoyl methane, di-acetyl benzoyl methane, stearoyl benzoyl methane, palmitoyl benzoyl methane, lauroyl benzoyl methane, di-benzoyl methane, bis(4-chlorobenzoyl)methane, bis(methylene-3,4-dioxybenzoyl) methane, benzoyl acetyl phenyl methane, stearoyl (4-methoxybenzoyl)methane, butanoyl acetone, di-stearoyl methane, acetyl acetone, stearoyl acetone, bis(cyclo-hexanoyl)-methane, and di-pivaloyl methane.

In the pellet of the present invention, the content of the oxidation catalyst preferably is 1 to 20% by weight, more preferably 2 to 10% by weight, based on the content of the thermoplastic resin (A). If a transition metal catalyst is used as the oxidation catalyst, the content of the oxidation catalyst (as the amount of transition metal) is 100 to 20000 ppm, preferably 2000 to 10000 ppm, based on the content of the thermoplastic resin (A). If the content of the transition metal catalyst is within the above range, the oxidation catalyst can be uniformly formulated and the pellet can be prepared without production problems.

The pellet of the present invention is used to prepare an oxygen-absorbing resin composition in which when the pellet is mixed with a trigger resin and a thermoplastic resin (C), the trigger resin functions as a trigger to cause the oxidation of the thermoplastic resins (A) and (C) to proceed, whereby oxygen is absorbed. In accordance with the nature of the present invention, the shape of the pellet of the present invention is not restricted to a specific shape. A specific shape thereof includes spherical, semispherical, cylindrical, prismatic, circular cylindrical, go-stone and rugby ball shapes. From the viewpoint of manufacturing, a spherical shape is preferable. In addition, the size of the pellet of the present invention is not specifically restricted in accordance with the nature of the present invention. From the viewpoint of manufacturing, a pellet of 2 to 10 mm is preferable, a pellet of 3 to 8 mm is more preferable.

The pellet of the present invention comprising a core part and coating part preferably has a core-in-sheath structure or core-shell structure. In addition, a weight ratio of core:sheath (shell) is preferably 10:90 to 90:10 and more preferably 50:50 to 90:10.

The pellet of the present invention can be prepared by dry-blending an oxidation catalyst and thermoplastic resin and melt kneading said blend using an extruder, which may be single screw extruder or twin-screw extruder. The pellet of the present invention comprising a core part and coating part, in the case of a core-in-sheath structure, can be prepared by feeding a thermoplastic resin comprising an oxidation catalyst which becomes the core part and a thermoplastic resin which becomes the sheath part into the multilayer strand die wherein both thermoplastic resins are in the heating and melting form using separate extruders in order to extrude them, and cutting said extrudate. Said pellet of the present invention, in the case of a core-shell structure, can be prepared by intermittently extruding a thermoplastic resin comprising an oxidation catalyst which becomes the core part into flow channel of main extrusion in which a thermoplastic resin which becomes the cell part can flow in the heating and melting form in order to produce a complex resin flow in which the core resins positioned in the shell at intervals are substantially surrounded thereby, and cutting said product.

The oxygen-absorbing resin composition of the present invention can be obtained by mixing the foregoing pellet, a thermoplastic resin (C) and a trigger resin which functions as a trigger of oxidation. In addition, the oxygen-absorbing resin composition of the present invention can be obtained by mixing a masterbatch containing a thermoplastic resin (A) and an oxidation catalyst, a thermoplastic resin (C) and the trigger resin which functions as a trigger of the oxidation, wherein the trigger resin functions as a trigger to cause the oxidation of the thermoplastic resin (C) to proceed, whereby oxygen is absorbed.

Thermoplastic resins shown as examples of the thermoplastic resins (A) and (B) can be used as the thermoplastic resin (C). The oxygen-absorbing resin composition of the present invention may be prepared by using the thermoplastic resin (B) identical to the thermoplastic resin(s) (A) and/or (B), or different from the thermoplastic resins (A) and (B).

The foregoing resin capable of serving as the trigger is one other than the foregoing thermoplastic resin and can be a trigger for the oxidation of the thermoplastic resin. Such a resin capable of serving as the trigger may preferably be a resin having carbon-hydrogen bonds, in which hydrogen atoms can easily be extracted from methylene chains present therein; for instance, a resin having carbon-carbon double bonds in the main chain or side chains; a resin having tertiary carbon atoms in the main chain; a resin having active methylene groups in the main chain; and a resin carrying aldehyde groups. These trigger resins may be incorporated into the thermoplastic resin alone or in any combination of at least two of them.

Examples of the trigger resins having carbon-carbon double bonds in the main chain or side chains include resins containing monomer units derived from linear or cyclic, conjugated or non-conjugated polyenes. Examples of such monomers are conjugated dienes such as butadiene and isoprene; linear non-conjugated dienes such as 1,4-hexadiene, 3-methyl-1,4-hexadiene, 4-methyl-1,4-hexadiene, 5-methyl-1,4-hexa-diene, 4,5-dimethyl-1,4-hexadiene and 7-methyl-1,6-octadiene; non-conjugated cyclic dienes such as methyl tetrahydro-indene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene and dicyclo-pentadiene; and trienes such as 2,3-diiso-propylidene-5-norbornene, 2-ethylidene-3-isopropylidene-5-norbornene, and 2-propenyl-2,2-norbornadiene. Specific examples of polymers are polybutadienes, polyisoprenes, ethylene-propylene-diene copolymers, polyterpenes and dicyclopentadiene resins. Preferably used herein are resins carrying a tertiary carbon atom at an allyl-position in view of the trigger effect thereof and, from among them, preferably used herein are resins having cyclic alkene structures at allyl-positions which structures carry tertiary carbon atoms since they generate only a small amount of the oxidation by-products.

Examples of trigger resins having tertiary carbon atoms in the main chain thereof, suitably used herein, are polymers or copolymers carrying monomer units derived from an α-olefin having 3 to 20 carbon atoms, or polymers or copolymers carrying benzene rings on side chains thereof. Specific examples of the foregoing α-olefins are propylene, 1-butene, 1-pentene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene and 12-ethyl-1-tetradecene. Specific examples of polymers include, in particular, polypropylene, poly-1-butene, poly-1-hexene, poly-1-octene, ethylene-propylene copolymer, ethylene-butene-1 copolymer and ethylene-propylene-1-butene copolymer. The foregoing monomers carrying benzene rings on side chains thereof may be, for instance, alkenyl benzenes such as styrene, 3-phenylpropene and 2-phenyl-2-butene. Specific examples of the polymers thereof are polystyrene, styrene copolymer, styrene-butadiene copolymer or styrene-isoprene copolymer. The aromatic rings of these styrene polymers may have substituents. In particular, preferably used herein as such substituents may be, for instance, those capable of forming resonance structures with aromatic rings such as substituents having an unshared electron pair, or substituents carrying a polar multiple bond, or substituents capable of undergoing hyperconjugation.

The foregoing trigger resin having active methylene groups in the main chain may be one carrying, in the main chain thereof, an electron attractive group, in particular, a carbonyl group and a methylene group adjacent thereto and specific examples thereof include copolymers of carbon monoxide and olefins, in particular, carbon monoxide-ethylene copolymers.

The resin carrying aldehyde groups is one prepared by the radical-polymerization of monomers such as acrolein and/or metacrolein and copolymers of these monomers with styrene may likewise be used preferably.

As the foregoing resin capable of serving as the trigger, particularly preferred are polystyrenes or styrene copolymers which have benzene rings on the side chains thereof (in this specification, the resin is also referred to as "styrenic resin(s)") in view of its function as the trigger for the oxidation of the foregoing thermoplastic resin.

The styrene copolymer preferably has sites derived from dienes from the viewpoint of the trigger effect. Such sites derived from dienes preferably contain isoprene units or butadiene units and, in particular, preferably used herein are copolymers of styrene with isoprene or butadiene such as styrene-isoprene copolymers and styrene-butadiene copolymers. The copolymer may be in any state such as random copolymers or block copolymers. In this connection, the block copolymers are preferably used herein from the viewpoint of their effect as a trigger and particularly preferably used herein are styrene-isoprene block copolymers and styrene-butadiene block copolymers each having a styrene block at the terminal of the molecule. Particularly preferred are styrene-isoprene-styrene tri-block copolymers and styrene-butadiene-styrene tri-block copolymers. Regarding the chemical structures, the foregoing tri-block copolymers may be linear or radial ones.

The copolymer obtained by moderately hydrogenating the sites derived from dienes present in the foregoing styrene copolymer carrying sites derived from dienes is particularly preferred since such a copolymer permits the inhibition of any deterioration and coloration observed when molding the resulting resin composition. Such sites derived from dienes are preferably isoprene units and butadiene units and particularly preferably used herein are hydrogenated styrene-isoprene copolymers and hydrogenated styrene-butadiene copolymers as hydrogenated products of styrene-isoprene and styrene-butadiene copolymers. The copolymers may be in any state such as random copolymers or block copolymers. In this connection, the block copolymer is preferably used herein from the viewpoint of their effect as a trigger and particularly preferably used herein are styrene-isoprene block copolymers and styrene-butadiene block copolymers having a styrene block at the terminal of the molecule and more preferably used herein are hydrogenated styrene-isoprene-styrene tri-block copolymers and hydrogenated styrene-butadiene-styrene tri-block copolymers. Regarding the chemical structures, the foregoing tri-block copolymers may be linear or radial ones and the carbon-carbon double bonds in the diene sites prior to the hydrogenation may be present in the main chains in the form of vinylene groups or present on side chains in the form of vinyl groups. In addition, examples of such random copolymers include hydrogenated styrene-isoprene random copolymers and hydrogenated styrene-butadiene random copolymers.

Moreover, since other forms of the styrene copolymers whose sites are derived from dienes are moderately hydrogenated, hydrogenated styrene-diene-olefin (crystalline) tri-block copolymers are also useful and particularly preferably used herein are hydrogenated styrene-butadiene-olefin (crystalline) tri-block copolymers since they can inhibit the generation of oxidation by-products. From among them, preferably used herein are hydrogenated styrene-butadiene-polyethylene tri-block copolymers.

Furthermore, regarding the foregoing resins having carbon-carbon double bonds in the main chain or side chains, resins having tertiary carbon atoms in the main chain, and resins having active methylene groups in the main chain listed above as the resins capable of serving as triggers, the resins capable of serving as triggers tend to inhibit the oxidation of the thermoplastic resins if the resins capable of serving as triggers have carbon-carbon double bonds in excess from the viewpoint of heat stability during molding and their function as triggers for the oxidation of the thermoplastic resins. In this respect, the carbon-carbon bonds present in the benzene ring are not herein defined to be carbon-carbon double bonds.

Further, if the oxygen absorptive resin composition of the present invention includes carbon-carbon double bonds in excess, the composition conversely tends to inhibit the oxidation of the thermoplastic resin. Moreover, this also causes the pigmentation of the oxygen absorptive resin composition during molding.

In this connection, the molecular weight of the resin serving as a trigger is not particularly restricted, but the number average molecular weight thereof is preferably in the range of from 1,000 to 500,000 and more preferably 10,000 to 250,000 in view of the dispersibility thereof in the thermoplastic resin.

It is preferred to use, as the styrenic resin, a resin (A) and a resin (B), whose styrene contents differ from one another, in combination to improve the oxygen-absorbing rate. The styrene content of the resin (A) is preferably in the range of from 60 to 90% by mass and more preferably 60 to 70% by mass. The styrene content of the resin (B) is preferably not more than 50% by mass, more preferably 10 to 40% by mass and further preferably 10 to 30% by mass. In addition, the difference between the styrene contents of the resins (A) and (B) is preferably not less than 20% by mass, more preferably 20 to 60% by mass and further preferably 30 to 60% by mass. The resin (A) is preferably a hydrogenated styrene-isoprene copolymer or a hydrogenated styrene-butadiene copolymer which is a hydrogenation product of a copolymer of styrene with isoprene or butadiene, with a hydrogenated styrene-butadiene-styrene tri-block copolymer being particularly preferred. The resin (B) is preferably a hydrogenated styrene-isoprene copolymer or a hydrogenated styrene-butadiene copolymer which is a hydrogenation product of a copolymer of styrene with isoprene or butadiene and particularly preferably a hydrogenated styrene-butadiene-styrene tri-block copolymer, a hydrogenated styrene-butadiene random copolymer or a hydrogenated styrene-butadiene-polyethylene tri-block copolymer. The mixing ratio of the resin (A) to the resin (B) is preferably in the range of from 1:9 to 9:1, more preferably 2:8 to 8:2 and further preferably 3:7 to 5:5.

The foregoing thermoplastic resins are preferably incorporated into the resin composition of the present invention in a high rate so that it can form a matrix and that it can absorb a large quantity of oxygen through the oxidation thereof and therefore, the content thereof in the resin composition more preferably ranges from 90 to 99% by mass and further preferably 92.5 to 97.5% by mass. In addition, the resins capable of serving as triggers are preferably incorporated into the resin composition in a low rate so that the copolymer can serve as a trigger for the oxidation of the foregoing thermoplastic resins and accordingly, if taking into consideration the molding properties of the resulting resin composition observed when molding the same into a film, a sheet or a cup, a tray, a bottle, a cube or a cap, the content of the copolymer (A) in the composition preferably ranges from 1 to 10.0% by mass and more preferably 2.5 to 7.5% by mass.

In the oxygen-absorbing resin composition of the present invention, the transition metal catalyst is preferably included therein in an amount ranging from 10 to 1000 ppm and in particular, 50 to 500 ppm as expressed in terms of the amount of the transition metal on the basis of the total mass of the oxygen-absorbing resin composition. If the amount of the transition metal catalyst falls within the range specified above, the resulting resin composition surely has good gas-barrier properties and likewise has excellent resistance to any deterioration during the kneading and molding operations of the same.

The preparation of the oxygen-absorbing resin composition through blending may be carried out using a variety of means, but preferably used herein is one which makes use of a twin-screw extruder provided with a side feed means. The kneading of the ingredients for the oxygen-absorbing resin composition in a twin-screw extruder is preferably carried out in a non-oxidizing atmosphere in order to minimize any possible deterioration of the resin composition. Moreover, it is quite important to shorten the residence time and to reduce the molding temperature to a level as low as possible and this in turn results in the maintenance of the desired quality of the resulting oxygen-absorbing resin composition.

The oxygen-absorbing resin composition used in the present invention, if desired, comprises an activator known per se, but the addition thereof is not always necessary. Examples of such activators appropriately used herein include, but not limited to, hydroxyl group and/or carboxyl group-containing polymers such as polyethylene glycol, polypropylene glycol, ethylene-methacrylic acid copolymers, and various kinds of ionomers.

The oxygen-absorbing resin composition used in the present invention may likewise comprise a filler, a coloring agent, a heat stabilizer, a weathering agent, an antioxidant other than the phosphorus atom-containing ones, an age resister, a light stabilizer, a UV absorber, an antistatic agent, a lubricating agent such as a metal soap or a wax, and/or a known resin compound such as a modifier resin or rubber according to the formulations known per se.

For instance, the incorporation of a lubricating agent into the resin composition permits the improvement of the bite of a screw into the resin. Examples of such lubricating agents currently used are metal soaps such as magnesium stearate and calcium stearate; liquid, natural or synthetic paraffin; hydrocarbon type ones such as microwaxes, polyethylene waxes and chlorinated polyethylene waxes; fatty acid type ones such as stearic acid and lauric acid; fatty acid monoamide or bisamide type ones such as stearic acid amide, palmitic acid amide, oleic acid amide, esilic acid amide, methylene bis-stearamide, and ethylene bis-stearamide; ester type ones such as butyl stearate, hardened castor oil, and ethylene glycol monostearate; alcohol type ones such as cetyl alcohol and stearyl alcohol; and mixtures thereof.

In this connection, however, some of these additives may inhibit the oxidation reaction and/or extend the induction period thereof. Accordingly, the amount of the additives should be limited to the lowest necessary level. Examples of such additives which may inhibit the oxidation reaction in the present invention include basic compounds.

The oxygen-absorbing resin composition of the present invention can be used for the absorption of oxygen within a sealed package, in a variety of forms such as powder, granules or a sheet. Moreover, the resin composition is incorporated into resin or rubber used for preparing a liner, a gasket or a coated film and used for absorbing oxygen in such a form as a liner, a gasket or a coated film. In addition, the resin composition may be formed into, for instance, a film or a sheet and then used as a packaging material, or may be used in the preparation of packages in the form of a cap for packaging containers such as a cup, a tray, a bottle and a tubular container.

The oxygen-absorbing resin composition of the present invention is preferably used in the form of a multi-layered structure which comprises at least one layer containing the resin composition (hereunder referred to as "oxygen-absorbing layer") and a layer of a resin other than the foregoing resin composition. In this respect, the term "layer containing the (oxygen-absorbing) resin composition" used herein means both of a layer comprising the foregoing oxygen-absorbing resin composition alone and a layer comprising the oxygen-absorbing resin composition which is incorporated into another resin which differs from the oxygen-absorbing resin composition and is a base material.

The resin layer other than the oxygen-absorbing layer which constitutes the multi-layered structure can appropriately be selected from thermoplastic resins or thermosetting resins while taking into consideration the modes of applications thereof and/or required functions. Examples thereof include olefinic resins, thermoplastic polyester resins and resins having oxygen-barrier properties (hereunder referred to as "oxygen-barrier resins").

The foregoing olefinic resins may be, for instance, polyethylenes (PE) such as low-density polyethylene (LDPE), medium-density polyethylene (MDPE), high-density polyethylene (HDPE), linear low-density polyethylene (LLDPE), linear ultra low-density polyethylene (LVLDPE), polypropylenes (PP), ethylene-propylene copolymers, polybutene-1, ethylene-butene-1 copolymers, propylene-butene-1 copolymers, ethylene-propylene-butene-1 copolymers, ethylene-vinyl acetate copolymers, and ionic crosslinked olefinic copolymers (ionomers) or blends thereof.

In addition, examples of thermoplastic polyester resins usable herein include polyethylene terephthalate (PET), polybutylene terephthalate (PBT), polyethylene naphthalate (PEN), polyester resins mainly comprising polyglycolic acids or copolymerized polyesters thereof, or blends thereof.

The oxygen-barrier resins may be, for instance, ethylene-vinyl alcohol copolymers (EVOH). For instance, a saponified copolymer may be used, which can be prepared by saponifying an ethylene-vinyl alcohol copolymer which has an ethylene content ranging from 20 to 60 mole % and preferably 25 to 50 mole % to a degree of saponification on the order of not less than 96 mole % and preferably not less than 99 mole %.

This saponified ethylene-vinyl alcohol copolymer has a molecular weight which permits the formation of a film thereof. The saponified product in general has a viscosity of not less than 0.01 dl/g and preferably 0.05 dl/g, as determined at 30° C. using a solution in an 85:15 (ratio by weight) mixed solvent comprising phenol and water.

Examples of other oxygen-barrier resins are polyamide resins such as poly(m-xylidene adipamide) (MXD6) and polyester resins such as polyglycolic acids.

The construction of the foregoing multi-layered structure may be appropriately selected, while taking into consideration the applications thereof and/or the required functions. The following are examples of such a multi-layered structure, in which the oxygen-absorbing layer is represented by the symbol: OAR.

Two-Layer Structure: PET/OAR; PE/OAR; PP/OAR;
Three-Layer Structure: PE/OAR/PET; PET/OAR/PET; PE/OAR/OPP; EVOH/OAR/PET; PE/OAR/COC; PP/OAR/PET; PP/OAR/PP; PP/OAR/COC;
Four-Layer Structure: PE/PET/OAR/PET; PE/OAR/EVOH/PET; PET/OAR/EVOH/PET; PE/OAR/EVOH/COC; PE/OAR/EVOH/PE; PP/PET/OAR/PET; PP/OAR/EVOH/PET; PP/OAR/EVOH/COC; PP/OAR/EVOH/PE; PP/OAR/EVOH/PE;
Five-Layer Structure: PE/OAR/PET/OAR/PET; PE/PET/OAR/EVOH/PET; PET/OAR/EVOH/COC/PET; PET/OAR/PET/COC/PET; PE/OAR/EVOH/COC/PET; PE/EVOH/OAR/EVOH/PE; PP/PET/OAR/EVOH/PET; PP/OAR/EVOH/COC/PET; PP/EVOH/OAR/EVOH/PP;
Six-Layer Structure: PET/OAR/PET/OAR/EVOH/PET; PE/PET/OAR/COC/EVOH/PET; PET/OAR/EVOH/PET/COC/PET; PE/EVOH/OAR/PE/EVOH/PE; PP/PET/OAR/COC/EVOH/PET; PP/EVOH/OAR/PP/EVOH/PP;
Seven-Layer Structure: PET/OAR/COC/PET/EVOH/OAR/PET.

In this connection, PE represents low-density polyethylene (LDPE), medium-density polyethylene (MDPE), high-density polyethylene (HDPE), linear low-density polyethylene (LLDPE), or very linear low-density polyethylene (LV-LDPE). In a case where PE or PP is used for forming an intermediate layer, these materials PE and PP may be used for forming the regrind resin composition-containing layer constituting the multi-layer structure of the present invention. The regrind resin composition is a composition containing scrap resins generated during, for instance, the molding operations of the multi-layer structured containers according to the present invention and in general comprises a mixed resin containing such scrap resin and virgin resins such as olefinic resins constituting multi-layer structured containers, from the viewpoint of the moldability thereof. In addition, the regrind resin composition may likewise comprise a deodorizing agent or an adsorbent.

In these structures, those having at least one oxygen-barrier layer are preferred since the presence of such an oxygen-barrier layer would allow the lengthening of the lifetime of the oxygen-absorbing layer.

When preparing the foregoing laminated body, an adhesive resin layer may, if necessary, be arranged between each pair of the neighboring two layers. Such an adhesive resin may be, for instance, a copolymer containing, in the main chain or on side chains, carboxylic acids, carboxylic acid anhydrides, and/or carboxylic acid in an amount ranging from 1 to 700 milli-equivalent (meq)/100 g resin, in particular, 10 to 500 meq/100 g resin.

Specific examples of the adhesive resins include ethylene-acrylic acid copolymers, ionically crosslinked olefinic copolymers, maleic acid anhydride-grafted polyethylenes, maleic acid anhydride-grafted polypropylenes, acrylic acid-grafted polyolefins, ethylene-vinyl acetate copolymers, copolymerized polyesters, and copolymerized polyamides, or any combination of at least two of them.

These adhesive resins are useful in the lamination through, for instance, the co-extrusion or sandwich-lamination technique. Moreover, it is also possible to use a thermosetting adhesive resin such as an isocyanate type one and an epoxy type one, in the lamination of a film having gas-barrier properties formed in advance with a water vapor-resistant resin film through the use of an adhesive.

In the laminate which makes use of the oxygen absorptive resin composition of the present invention, it is preferred that a deodorizing agent or an adsorbent for the oxidation by-products (in the specification, also referred to as "an oxidation by-product scavenger") be used in any one of the foregoing layers, in particular, the layer positioned on the inside of the oxygen-absorbing layer, in order to trap the by-products generated when the resin composition absorbs oxygen.

The oxidation by-product scavenger may be one known per se and specific examples thereof include naturally occurring zeolite, synthetic zeolite, silica gel, active carbon, impregnated active carbon, activated clay, activated aluminum oxide, clay, diatomaceous earth, kaolin, talc, bentonite, sepiolite, attapulgite, magnesium oxide, iron oxide, aluminum hydroxide, magnesium hydroxide, iron hydroxide, magnesium silicate, aluminum silicate, synthetic hydrotalcite and amine-carrying porous silica. From among these, amine-carrying porous silica is preferably used herein because of its high reactivity with the oxidation by-products, aldehydes and the so-called high silica zeolite (zeolite having a high silica content), whose silica/alumina ratio is high, is preferred since it shows excellent adsorptivity to a variety of oxidation by-products and has excellent transparency. Such high silica zeolite preferably has a silica/alumina ratio (molar ratio) of not less than 80, more preferably not less than 90 and further preferably 100 to 700. The zeolite having such a high silica content is particularly effective for use in packages for packaging water-containing contents since such zeolite has an improved ability to trap the oxidation by-products formed through oxidation under such a high humidity condition that the adsorptivity of the zeolite having a low silica/alumina ratio would be deteriorated. Examples of exchanged cations of the high silica zeolite are alkali metal ions such as sodium, lithium and potassium ions; and alkaline earth metal ions such as calcium and magnesium ions, which should be used alone or in any combination of at least two of them. In this case, it is preferred that at least sodium ions be included as the exchanged cations and in particular, it is preferred that substantially all of the exchanged cations be sodium ions. Such high silica zeolites particularly preferably used herein are, for instance, ZSM-5 type ones. Moreover, it is also important that the high silica zeolite have a pomegranate-like structure formed through the agglomeration of fine particles thereof, and thus due to such a pomegranate-like structure, the high silica zeolite has an increased surface area available for the adsorption and is also effective for adsorption of an organic compound having a size substantially greater than that estimated on the basis of the pores of the simple zeolite. The zeolite used in the present invention preferably has an average particle size in the range of from 0.5 to 10 μm.

In the present invention, specific examples of preferred multi-layer structures include those comprising the following 10 layers in the order starting from the outermost layer: an outermost layer/an adhesive layer/a resin layer having gas-barrier properties/an oxygen-absorbing layer/an oxidation by-product scavenger-containing layer/an adhesive layer/a resin layer having gas-barrier properties/an adhesive layer/an innermost layer. Moreover, multi-layer structures in which the oxidation by-product scavenger-containing layer comprises a regrind resin composition are preferable.

The foregoing multi-layered structure can be produced according to the method known per se. For instance, the structure may be prepared according to the usual extrusion molding, while using a number of extruders corresponding to the kinds of resins to be used and a multiple die for multilayer.

Alternatively, the multi-layered structure can likewise be produced according to the co-injection molding technique or the successive injection molding technique, while using a number of injection molding machines corresponding to the kinds of resins to be used to thus form a multi-layered, injection molded body.

Moreover, a film or sheet having a multi-layered structure according to the present invention can be prepared according to the extrusion coating technique or the sandwich-lamination technique. Alternatively, a multi-layered film or sheet can likewise be produced according to the dry-lamination of preliminarily prepared films.

The packaging materials such as films can be used in the form of a bag for packaging having a variety of shapes, such a bag may be produced according to the bag-making method known per se and examples of such bags include, but not limited to, three side-sealed or four side-sealed pouches, gusseted pouches, standing pouches and pillow type packaging bags.

The packaging containers prepared from the multi-layered structure according to the present invention are useful as containers which can protect the contents thereof from losing the flavor and taste of the same due to the oxidation.

Examples of substances which can be packed in the containers are those quite susceptible to deterioration in the presence of oxygen, for instance, beverages such as beer, wine, fruit juice, carbonated soft drinks, oolong tea, and green tea; foods such as fruits, nuts, vegetables, meat products, infant foods, coffee, jam, mayonnaise, ketchup, edible oils, dressings, sauces, foods boiled down in soy, and dairy products; and others such as medicines, cosmetic products, gasoline.

The foregoing packaging containers may be further packed in a wrapping body to thus complete the packaging. The present invention will now be described in more detail with reference to the following Examples and Comparative Examples, but the present invention is not restricted to these specific Examples at all.

EXAMPLES (Formulation of Resin)
[Preparation of Multilayer Pellet]

An oxidation catalyst cobalt stearate (available from Dainippon Ink & Chemicals, Inc.) in the form of tablet and a resin shown in Table 1 were dry blended, melt kneaded at 180° C. in a twin-screw extruder and then supplied into a multilayer strand die as a core part. At the same time, a resin shown in Table 1 was melt extruded from a single screw extruder at 180° C. and then supplied into the multilayer strand die as a coating part. A strand extruded from the die was water-cooled and then cut to produce an intended multilayer pellet. A ratio of the core part to the coating part (core part:coating part) was 70 wt. %:30 wt. %; and cobalt stearate was formulated so that a concentration thereof was 6.26 wt. % based on the total weight of the multilayer pellet. In order to prevent oxidation and thermal degradation upon kneading, a nitrogen purge was continuously conducted from the bottoms of the respective hoppers of the extruders. In addition, the core part was extruded in the twin-screw extruder while being evacuated to a high vacuum through a vent.

[Preparation of Oxygen-Absorbing Resin Composition]

4.17 wt. % of the multilayer pellet obtained from the multilayer strand die, 2.51 wt. % of a hydrogenated styrene-butadiene-styrene copolymer (TUFTEC P2000 available from Asahi Kasei Chemicals Co., Ltd.) (Trigger resin 1) and 2.51 wt. % of a hydrogenated styrene-butadiene-styrene copolymer (DYNALON 8601P: available from JSR Co., Ltd.) (Trigger resin 2) as trigger resins, and 19.80 wt. % of a linear low density polyethylene prepared using a Ziegler-Natta catalyst (NEO-ZEX 20201J available from Mitsui Chemical Co., Ltd.) (LLDPE-A) and 71.01 wt. % of a linear low density polyethylene prepared using a single site catalyst (EVOLUE SP0511 available from Mitsui Chemical Co., Ltd.) (LLDPE-B) as base resins were dry blended, and melt kneaded at 200° C. in a twin-screw extruder to produce an intended oxygen-absorbing resin composition. The oxygen-absorbing resin composition was sampled at a discharge rate of 70 kg/h for four hours. In order to prevent oxidation and thermal degradation upon kneading, a nitrogen purge was conducted from the bottom of hopper of extruder and the oxygen-absorbing resin composition was extruded in the extruder while being evacuated to a high vacuum by a vacuum pump through a vent. In addition, 200 mesh was used as a screen.

(Evaluation Item)
[Evaluation of Oxygen Absorption Capacity]

The oxygen-absorbing resin compositions (3.0 g) were put into an oxygen-impermeable container (High Retoflex: HR78-84 available from Toyo Seikan Kaisha Ltd.) having an inner volume of 85 cc (a cup form container prepared from a laminate: polypropylene/steel foil/polypropylene), followed by heat-sealing the container with a capping material consisting of polypropylene (inner layer)/aluminum foil/polyester (outer layer). The sealed container was stored at the temperature of 50° C. for 24 hours and the oxygen concentration within the container was determined by the gas chromatography technique. ○ shows absorbing 0.4 cc or more of oxygen per 1 g of the resin and × shows absorbing less than 0.4 of oxygen per 1 g of the resin.

[Evaluation of Degree of Contamination of Burnt Deposit]

It was determined if there is a burnt deposit in 50 g of the resulting oxygen-absorbing resin composition. ○ shows the oxygen-absorbing resin composition having the degree of contamination of the burnt deposit of less than 0.5%, Δ shows the oxygen-absorbing resin composition having the degree of contamination of the burnt deposit of 0.5% or more and less than 1.5% and × shows the oxygen-absorbing resin composition having the degree of contamination of the burnt deposit of 1.5% or more.

Example 1

LLDPE-A was used as resins of the core part and coating part to produce the multilayer pellet. The resulting multilayer pellet was then used to produce the oxygen-absorbing resin composition, which was evaluated as to an oxygen absorption capacity and degree of contamination of the burnt deposit.

As a result, it was found that the resulting oxygen-absorbing resin composition absorbs oxygen and has a low degree of contamination of the burnt deposit in the pellet and thus the pellet was good.

Example 2

In the same way as in Example 1, except that LLDPE-A was used as a resin of the core part and LLDPE-B was used as a resin of the coating part, the evaluations of an oxygen absorption capacity and degree of contamination of the burnt deposit were conducted.

As a result, although it was found that the resulting oxygen-absorbing resin composition has a high resin pressure and torque of LLDPE-B on producing the multilayer pellet, said composition can be pelletized without any problem. It was found that the resulting oxygen-absorbing resin composition has good oxygen absorption and a low degree of contamination of the burnt deposit in the pellet.

Example 3

6.26 wt. % of cobalt stearate (available from Dainippon Ink & Chemicals, Inc.) in the form of a tablet and 93.74 wt. % of LLDPE-A were dry blended and melt kneaded at 180° C. in a twin-screw extruder to produce a single layer pellet. 4.17 wt. % of the resulting pellet, 2.51 wt. % of Trigger resin 1, 2.51 wt. % of Trigger resin 2, 71.01 wt. % of base resin LLDPE-B and 19.80 wt. % of base resin LLDPE-A were dry blended and melt kneaded at 200° C. in a twin-screw extruder to produce an intended oxygen-absorbing resin composition. The oxygen-absorbing resin composition was sampled at a discharge rate of 70 kg/h for four hours. In order to prevent oxidation and thermal degradation upon kneading, a nitrogen purge was conducted from the bottom of the hopper of the extruder and the oxygen-absorbing resin composition was extruded in the extruder while being evacuated to a high vacuum by a vacuum pump through a vent. In addition, 200 mesh was used as a screen. The evaluations of an oxygen absorption capacity and degree of contamination of the burnt deposit of the resulting oxygen-absorbing resin composition were conducted.

As a result, it was found that the resulting oxygen-absorbing resin composition has good oxygen absorption. In addition, comparing with the case where the multilayer pellet of Example 1 was used, oxide and a thermal degradation product derived from cobalt stearate somewhat attached to a screw and barrel of the extruder, although this level does not cause any problem.

Comparative Example 1

In the same way as in Example 1, except that cobalt stearate was not added into the core part, the above evaluations were conducted.

As a result, it was found that the resulting oxygen-absorbing resin composition did not absorb oxygen because an oxidation catalyst cobalt stearate was not added. In this connection, the resulting oxygen-absorbing resin composition has a low degree of contamination of the burnt deposit in the pellet.

Comparative Example 2

Cobalt stearate in the form of tablet was ground and dry blended with trigger resins and base resins and then in the same way as in Example 1, the oxygen-absorbing resin composition was produced. The formulating ratio was as follows: 66.5 wt. % of LLDPE-A and 28.5 wt. % of LLDPE-B as base resins, 2.5 wt. % of Trigger resin 1, 2.5 wt. % of Trigger resin 2 and 150 ppm (in terms of cobalt metal) of the grounded cobalt stearate based on the total amount of the resins. The evaluations of an oxygen absorption capacity and degree of contamination of the burnt deposit of the resulting oxygen-absorbing resin composition then were conducted.

As a result, it was found that the resulting oxygen-absorbing resin composition has good oxygen absorption, but oxide and a thermal degradation product derived from cobalt stearate attached to a screw and barrel of the extruder and thus the attachment was incorporated into the pellet and became the burnt deposit.

The results obtained in the Examples and Comparative Examples are listed in the following Table 1. It is clear from Table 1 that use of a masterbatch including an oxidation catalyst cobalt stearate or a multilayer pellet consisting of a core part including an oxidation catalyst cobalt stearate and coating part can prevent the contamination of the burnt deposit derived from cobalt stearate and thus there was a clear difference in the evaluations of a degree of contamination of the burnt deposit of the resulting oxygen-absorbing resin compositions.

TABLE 1

| Ex. No. | Pellet for oxygen-absorbing resin composition | | | Oxygen-absorbing resin composition Evaluation | |
|---|---|---|---|---|---|
| | Core part | | Coating part Resin | Oxygen absorption capacity | Degree of contamination of burnt deposit |
| | Resin | Oxidation catalyst | | | |
| 1 | LLDPE-A | Cobalt stearate | LLDPE-A | ○ | ○ |
| 2 | LLDPE-A | Cobalt stearate | LLDPE-B | ○ | ○ |
| 3 | LLDPE-A | Cobalt stearate | — | ○ | Δ |
| 1* | LLDPE-A | — | LLDPE-A | x | ○ |
| 2* | Cobalt stearate was used in powder form rather than pellet form | | | ○ | x |

※LLDPE-A: a linear low density polyethylene prepared using a Ziegler-Natta catalyst.
※LLDPE-B: a linear low density polyethylene prepared using a single site catalyst.
*Comparative Example.

The invention claimed is:

1. A method for preventing an oxygen-absorbing resin composition from burning during melt kneading of the composition, comprising the steps of preparing a masterbatch which comprise a thermoplastic resin (A) and an oxidation catalyst and then melt kneading the masterbatch with a trigger resin and a thermoplastic resin (C), wherein the trigger resin functions as a trigger to cause the oxidation of the thermoplastic resins (A) and (C) to proceed, whereby oxygen is absorbed.

2. The method of claim 1, wherein the thermoplastic resin (A) comprises a polyethylene, the oxidation catalyst is a transition metal catalyst and the trigger resin is a styrene resin.

3. The method of claim 2, wherein the thermoplastic resin (A) is a linear low density polyethylene obtained by copolymerizing ethylene with not less than 4% by mass of a 1-alkene having 3 to 6 carbon atoms.

4. The method of claim 2, wherein the thermoplastic resin (C) comprises at least two polyethylenes and at least one of these polyethylenes is a linear low density polyethylene obtained by copolymerizing ethylene with not less than 4% by mass of a 1-alkene having 3 to 6 carbon atoms.

5. The method of claim 4, wherein the styrene resin comprises two kinds of styrene resins which are different in the styrene content from one another.

* * * * *